United States Patent [19]
Steele

[11] 3,939,941
[45] Feb. 24, 1976

[54] FUSE CORD
[75] Inventor: Daniel Steele, Stevenston, Scotland
[73] Assignee: Imperial Chemical Industries Limited, London, England
[22] Filed: Feb. 28, 1972
[21] Appl. No.: 229,810

[52] U.S. Cl. .............................. 181/116; 102/27 R
[51] Int. Cl.² ........................................ C01V 1/10
[58] Field of Search .................. 102/27 R; 181/116

[56] References Cited
UNITED STATES PATENTS
3,456,450   7/1969   Teichmann ...................... 181/.5 XC
FOREIGN PATENTS OR APPLICATIONS
592,050   2/1960   Canada .............................. 102/27
1,120,200   7/1968   United Kingdom ................. 102/27
1,910,934   2/1965   Germany Primary Examiner—Verlin R. Pendegrass
Attorney, Agent, or Firm—Cushman, Darby & Cushman

[57]         ABSTRACT

A fuse-cord comprising an explosive core and outer layer of elastomeric material formed with external ribs. The invention also includes a method of seismic prospecting using a detonating cord of this construction.

8 Claims, 2 Drawing Figures

FUSE CORD

The invention relates to fuse-cord of the kind commonly employed for the transmission of detonation and flame in blasting and seismic prospecting operations. The invention also includes a method of manufacturing the fuse-cord, and seismic prospecting using the fuse-cord.

Fuse-cord normally comprises a core of incendiary or explosive material surrounded by non-explosive wrapping materials, for example, textile yarns and/or synthetic plastics materials. Thus detonating cord usually has a core of powdered PETN (pentaerythritol tetranitrate) and safety fuse has a blackpowder core. The powder of the core is often encased in an envelope of paper or synthetic plastic film, textile yarns are wound around the envelope and a waterproofing layer of elastomeric thermoplastic material is extruded around the yarns. This plastic covered fuse is extensively used in applications wherein it is required to be fed into or drawn through boreholes or tubes or past abrasive objects with consequent risk of damage by abrasion or fouling (snagging) of the fuse-cord by its surroundings. One such application is in the seismic prospecting method described in United Kingdom Pat. Nos. 1,151,882 and 1,151,883 wherein a line of detonating cord is buried under the surface of a prospect area by feeding it downwardly into the surface layer through a conduit as the conduit is moved parallel to the ground surface. A further application is in underwater blasting where the cord is often pulled past rocks and the edges of the metal tubes used for loading the main blasting explosive charge.

It is an object of this invention to provide fuse-cord having enhanced resistance to damage by abrasion and snagging in normal use.

In accordance with the invention a fuse-cord comprises an explosive core and an outer layer of elastomeric material formed with external ribs. In addition to its enhanced abrasive resistance the fuse-cord of the invention has greater flexibility than the usual smooth cord and is easier to pull through the feed conduit in the aforementioned seismic prospecting method. A further advantage of the cord is that knots formed in the cord, for example, to join a branch line to a trunk line, have less tendency to slip in normal use.

The external ribs are conveniently longitudinal parallel ribs preferably curved in cross-section, the most preferred cross-sectional profile being semicircular. In the preferred cord the external surface is formed with alternating longitudinal ribs and flutes, the flutes being preferably curved and, more preferably, semicircular in cross-section.

The elastomeric material conveniently comprises synthetic plastics material, for example, polyethylene, polypropylene or polyvinyl chloride. It is also convenient to apply additional wrapping material intermediate of the explosive core and the outer layer of elastomeric material. For example, the core may have paper or plastics film around it as in conventional fuse-cords and may also be wrapped with strengthening spun layers of textile yarn, before the outer layer of elastomeric material is applied.

The elastomeric material may conveniently be applied by extruding it around the explosive core. Thus in accordance with the method of the invention a fuse-cord is made by feeding a core of explosive material, optionally encased in wrapping material, in a continuous manner through a die and extruding an elastomeric material through the die to deposit the elastomeric material as an annular externally ribbed layer around the said core, the die being formed with a cross-sectional profile as required for formation of external ribs on the extruded material.

Detonating fuse-cord of the invention is especially advantageous for generating seismic waves in the 'Geoseis' system of seismic prospecting wherein detonating cord is placed on or under the surface of a prospect area by feeding it into the ground through a tubular conduit as the conduit is moved through the upper ground layer. In the operation there is less 'drag' on the fuse-cord of the invention than on plain cords and the cord is less liable to snag on the ends of the conduit.

Thus the invention also includes a method of seismic prospecting wherein a detonating fuse-cord of the invention is fed in a continuous manner through an advancing tubular conduit to lie in a position substantially parallel to the upper ground layer of a prospect area, the fuse-cord is detonated and the resulting seismic waves are recorded after reflecting or refraction of subterranean rock layer interfaces.

In order to illustrate the invention further, a preferred fuse-cord is hereinafter described, by way of example only, with reference to the accompanying drawings wherein.

Figure 1:
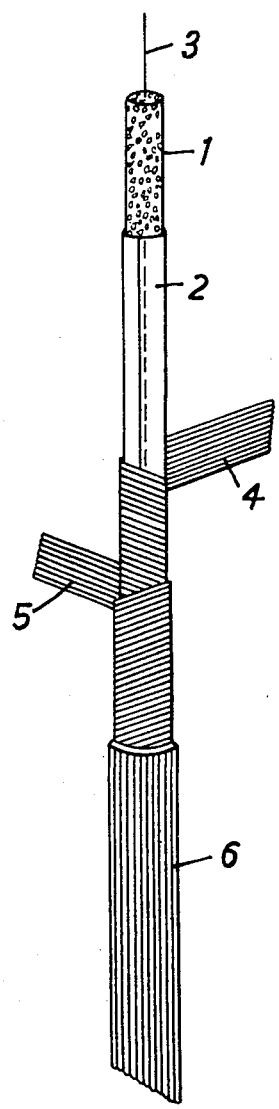
FIG. 1 shows diagrammatically a length of detonating fuse-cord with one end dissected.
Figure 2:
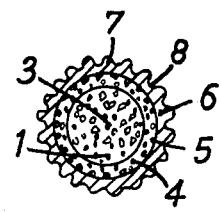
FIG. 2 is a cross-section of the fuse-cord of FIG. 1 on an enlarged scale.

The fuse-cord has a central core 1 of powdered explosive enclosed in a synthetic plastics tube 2, which is formed from a tape wrapped around the core so that its edges overlap. The core contains a single longitudinal yarn 3 to assist the flow of explosive powder from a die to form the explosive core during the fuse-cord manufacture. The tube 2 is surrounded by a spun layer of yarns or tapes 4 and a countering layer of yarns or tapes 5. The countering layer is surrounded by an extruded ribbed sheath 6 of waterproof thermoplastic material. This fuse-cord is readily manufactured in the spinning machines normally used for the manufacture of spun fuse-cords using a die of the required cross-sectional profile to apply the sheath 6.

EXAMPLES

Specific examples of a fuse-cord of the aforedescribed construction had a core 1 consisting of crystalline PETN loaded at a charge rate of 10 g per meter. The tube 2 was of glazed Kraft paper 13.5 millimeters wide and 0.18 millimeters thick and the central yarn 3 was a single yarn of 380 denier polypropylene. The spun layer 4 consisted of 10 strands of 2000 denier polypropylene tape (width 2.5 millimeters, thickness 0.01 millimeters) spun at 26 turns per meter and the countering layer 5 consisted of 8 strands of the same polypropylene tape spun at 39 turns per meter.

The outer sheath 6 was polyvinyl chloride in Example 1 and polyethylene in Example 3. In both Examples the sheath had 18 ribs 7 and 18 flutes 8, the sheath minimum thickness being 0.31 millimeters at the lowest point of the flutes and the maximum thickness being 0.62 millimeters at the highest point of the ribs. The overall diameter was 5 millimeters.

The flexibility, abrasive resistance and 'drag' of the cords were measured and the results are recorded in the following table. For comparison the results of the same tests on fuse-cords of the same construction but with plain outer sheaths 0.62 millimeters thick are also given in the table as Examples 2 and 4.

| Example | 1 | 2 | 3 | 4 |
|---|---|---|---|---|
| Sheath Material | Ribbed Polyethylene | Plain Polyethylene | Ribbed PVC | Plain PVC |
| Weight of Sheath (g/meter) | 6.17 | 8.72 | 8.93 | 12.33 |
| Flexibility (Weight for flexure - g) | 150 | 250 | 100 | 150 |
| Abrasion resistance (No. of passes for puncturing) | 164 | 137 | 500 | 9 |
| Drag | 1 lb | 2 lb | ½ lb | 3-7 lb |

The flexibility was determined as the weight required to bend a 10 cm length of cord clamped at one end through 90°.

The abrasion resistance was determined by passing a length of fuse-cord with a 1 Kg weight suspended from one end, over the right angled edge of a concrete block and observing the number of passes required to puncture the sheath.

The drag was determined as the force required to pull a length of fuse-cord at a steady rate of 2 meters per second through the feed pipe of a cord burying apparatus for placing cord for seismic prospecting. The tube was approximately 1.5 meters long and 2.5 cm diameter.

It is evident from the results that a cord of the invention having a ribbed outer sheath is superior to cords with plain sheaths in respect of flexibility, abrasion resistance and drag and is superior to the plain sheathed cord for burying in seismic prospecting operations and in other operations where there is a risk of damage to the cord by abrasion and snagging.

The superior flexibility of the ribbed cords facilitated the tying of knots in the cord and the ribs ensured that the knots did not slip. When bent the ribbed sheath did not ripple on the inside of the bend as happens with plain outer sheaths with consequent risk of 'snagging' at the ripple.

The cord of Examples 1 and 3 were equal to the corresponding cords of Examples 2 and 4 in respect of explosive properties and mechanical strength. They were also cheaper because there was less material in the outer sheath.

What we claim is:

1. A method of seismic prospecting wherein a detonating fuse-cord comprising an explosive core and an outer layer of elastomeric material formed with longitudinal external ribs is fed in a continuous manner through an advancing tubular conduit to lie in a position substantially parallel to the upper ground layer of a prospect area, the fuse-cord is detonated and the resulting seismic waves are recorded after reflection or refraction from subterranean rock layer interfaces, said longitudinal external ribs enabling said fuse-cord to pass through the advancing tubular conduit with less drag and greater abrasion resistance than a plain fuse-cord without the external ribs.

2. A method as claimed in claim 1 wherein the fuse-cord has parallel ribs.

3. A method as claimed in claim 1 wherein the ribs of the fuse-cord are semicircular in cross-section.

4. A method as claimed in claim 1 wherein the external surface of the fuse-cord is formed with alternating longitudinal ribs and flutes.

5. A method as claimed in claim 4 wherein the flutes are semicircular in cross-section.

6. A method as claimed in claim 1 wherein the layer of elastomeric material is an extruded layer of synthetic plastics material.

7. A method as claimed in claim 1 wherein the fuse-cord has an additional wrapping material intermediate of the explosive core and the outer layer of elastomeric material.

8. A method as claimed in claim 1 wherein the explosive core comprises pentaerythritol tetranitrate.

* * * * *